(12) United States Patent
Okubo

(10) Patent No.: US 7,791,323 B2
(45) Date of Patent: Sep. 7, 2010

(54) DC-DC CONVERTER UTILIZING RESPECTIVELY SEPARATE LOW-PASS FILTERS IN FEEDBACK CONTROL AND OUTPUT VOLTAGE SMOOTHING AND METHOD OF DESIGNING THE DC-DC CONVERTER

(75) Inventor: Atsunori Okubo, Kariya (JP)

(73) Assignee: Denso Corporation, Kariya (JP)

( * ) Notice: Subject to any disclaimer, the term of this patent is extended or adjusted under 35 U.S.C. 154(b) by 478 days.

(21) Appl. No.: 12/006,868

(22) Filed: Jan. 7, 2008

(65) Prior Publication Data

US 2008/0164959 A1 Jul. 10, 2008

(30) Foreign Application Priority Data

Jan. 9, 2007 (JP) ............................. 2007-001408

(51) Int. Cl.
G05F 1/56 (2006.01)
(52) U.S. Cl. ...................................... 323/282
(58) Field of Classification Search .................. 323/282
See application file for complete search history.

(56) References Cited

U.S. PATENT DOCUMENTS

| 4,866,367 | A | * | 9/1989 | Ridley et al. ................. 323/287 |
| 2003/0030385 | A1 | | 2/2003 | Toyama |
| 2003/0231010 | A1 | | 12/2003 | Sase et al. |
| 2004/0100238 | A1 | | 5/2004 | Asanuma et al. |
| 2005/0029997 | A1 | | 2/2005 | Sase et al. |
| 2005/0127886 | A1 | | 6/2005 | Sase et al. |
| 2008/0019160 | A1 | | 1/2008 | Umemoto et al. |
| 2009/0160579 | A1 | | 6/2009 | Serikawa et al. |

FOREIGN PATENT DOCUMENTS

| JP | 61-262078 | 11/1986 |
| JP | 04-079764 | 3/1992 |
| JP | 11-122911 | 4/1999 |
| JP | 2000-132248 | 5/2000 |
| JP | 2003/051394 | 2/2003 |
| JP | 2003-316454 | 11/2003 |
| JP | 2004-080985 | 3/2004 |
| JP | 2004-180407 | 6/2004 |

(Continued)

OTHER PUBLICATIONS

Watabe, S., "Phase Security", Know Control; http://www.asahi-net.or.jp/bz9s-wtb/index.htm; Dec. 2001; pp. 3-1 ~ 3-8 (w/partial English translation).

(Continued)

Primary Examiner—Jeffrey L Sterrett
(74) Attorney, Agent, or Firm—Harness, Dickey & Pierce, PLC

(57) ABSTRACT

A DC-DC converter includes a switching circuit controlled to convert an input DC voltage to a voltage having a repetitively varying waveform, a first low-pass filter circuit that includes a first capacitor and which smoothes the output voltage from the switching circuit, a control circuit applying feedback control to the switching circuit to regulate the output voltage from the first low-pass filter circuit, and a second low-pass filter circuit including a second capacitor, for smoothing the output voltage from the first low-pass filter circuit, with the second capacitor selected to have a lower value of equivalent series resistance than the first capacitor.

6 Claims, 2 Drawing Sheets

FOREIGN PATENT DOCUMENTS

| | | |
|---|---|---|
| JP | 2004-254488 | 9/2004 |
| JP | 2005-198415 | 7/2005 |
| JP | 2005-218157 | 8/2005 |
| JP | 2006-352059 | 12/2006 |
| WO | WO 2005/046036 | 5/2005 |

OTHER PUBLICATIONS

Sanyo, "Method Of Preventing Oscillation"; Application Of Switching Power Supply To Smoothing Capacitor; pp. 82-86 (w/partial English translation).

Mattingly, D., "Designing Stable Compensation Networks for Single Phase Voltage Mode Buck Regulators"; Technical Brief 417; Dec. 2003; pp. 1-10.

Official communication dated Oct. 28, 2008 in Japanese Application No. 2007-001408.

Official communication dated Mar. 10, 2009 in Japanese Application No. 2007-001408.

Official communication dated Sep. 8, 2009 in corresponding Japanese Application No. 2007-001408.

* cited by examiner

DC-DC CONVERTER UTILIZING RESPECTIVELY SEPARATE LOW-PASS FILTERS IN FEEDBACK CONTROL AND OUTPUT VOLTAGE SMOOTHING AND METHOD OF DESIGNING THE DC-DC CONVERTER

CROSS-REFERENCE TO RELATED APPLICATIONS

This application is based on and incorporates herein by reference Japanese Patent Application No. 2007-001408 filed on Jan. 9, 2007.

BACKGROUND OF THE INVENTION

1. Field of Application

The present invention relates to a DC-DC converter which applies feedback control of a switching element for setting an output voltage at a target value, and to a method of designing such a DC-DC converter.

2. Description of Related Art

Types of DC-DC converter are known, for converting an input DC voltage to an output DC voltage that is different from the input DC voltage, by driving a switching element by a PWM (pulse width modulation) signal to convert the input DC voltage to a voltage having a repetitively varying waveform, which is smoothed by a smoothing circuit to obtain the output DC voltage. In general, the smoothing circuit is a LPF (low-pass filter). The duty ratio of the PWM signal is controlled such as to maintain the level of the output DC voltage at a predetermined value. Such a type of DC-DC converter is generally referred to as a chopper-type of switching regulator.

With such a type of DC-DC converter, in order to reduce the amount of ripple in the output DC voltage and to reduce the danger of oscillation occurring in the feedback control loop (i.e., which is a negative-feedback loop), it is necessary to maintain a sufficiently large phase margin at the cut-off frequency of the smoothing circuit. The phase margin is the difference between the phase delay angle of the control loop and 180°, and the cut-off frequency is the frequency at which the loop gain of the control loop reaches 0 dB.

With regard to achieving a high degree of smoothing of ripple, it is preferable to use a smoothing circuit in which the capacitor has as small a value of ESR (equivalent series resistance) as possible, such as an organic high-molecular capacitor or a ceramic capacitor. This is due to the fact that when noise current components pass through the capacitor, the resultant voltage variations which occur across the ESR of the capacitor produce noise in the output DC voltage of the converter.

A generally used method of setting a high value of phase margin is to set the loop gain at high frequencies to become 0 dB before the phase delay angle reaches 180°, with this being referred to as the phase delay compensation method. Another method of setting a high value of phase margin is to advance the phase, i.e., a phase advance compensation method, for example as described in an Internet on-line document which was found by a search made on 15 Dec. 2006, URL:http://www.asahi-net.or.jp/~bz9s-wtb/doc/power/N01/tip1c3b.pdf, "Know Control", pages 6-8.

If a capacitor having a small value of ESR is used in the smoothing circuit of the control loop, then the effectiveness of ripple exclusion is enhanced, however as shown in FIG. 2, due to the fact that phase rotation becomes rapid, it is difficult to maintain a sufficient phase margin. Hence the problem arises that the stability of feedback control is lowered.

FIG. 2 is a Bode diagram showing DC-DC converter characteristics, with the full-line portion being a phase characteristic for the case in which a high-ESR capacitor is used in the smoothing circuit of the control loop of the DC voltage, and with the broken-line portion being a phase characteristic for the case in which a low-ESR capacitor is used.

If a phase compensation method is used, to achieve a sufficiently large phase margin, then this results in lowering of the loop gain, and may require the use of an additional special circuit for advancing the phase, so that the circuit configuration becomes complex.

If the phase delay compensation method is used, the problem arises that since high-frequency components are excluded from the feedback information (i.e., high frequency components of the feedback control signal are attenuated), there is a lowering of the speed of control response to variations in the input DC voltage of the converter. On the other hand, If the phase advance compensation method is used, the problem arises that it is extremely difficult to implement a circuit design whereby only the phase of the feedback control signal will be advanced, without affecting the loop gain.

SUMMARY OF THE INVENTION

It is an objective of the present invention to overcome the above problems by providing a DC-DC converter and a method of designing the DC-DC converter, whereby ripple can be effectively excluded from the output voltage of the DC-DC converter while only a simple circuit configuration is utilized, and whereby a high speed of response together with stability of operation can be achieved for a feedback control circuit of the DC-DC converter.

The invention is applicable for example to a DC-DC converter comprising a switching circuit which converts an input DC voltage to a voltage having a repetitively varying waveform, a first low-pass filter circuit which incorporates a capacitor and which smoothes the voltage produced by the switching circuit, and a control circuit for applying feedback control to the switching circuit based the output voltage from the first low-pass filter circuit, to maintain the output voltage at a predetermined target value. When applied to such a DC-DC converter, the invention is characterized in that:

(a) a second low-pass filter circuit (also incorporating a capacitor) is added, for smoothing the output voltage from the first low-pass filter circuit to thereby produce a smoothed output DC voltage of the DC-DC converter;

(b) the capacitor of the first low-pass filter circuit is selected to have a value of ESR (equivalent series resistance) sufficiently large that the control circuit operates with a phase margin exceeding a predetermined phase margin value (e.g., 30°), with the phase margin being specified with respect to the frequency at which the control circuit loop gain becomes zero, and (c) the capacitor of the second low-pass filter circuit is selected to have a value of ESR that is less than the ESR of the capacitor of the first low-pass filter circuit and is sufficiently low to enable the second low-pass filter circuit to achieves a required degree of ripple exclusion (i.e., higher than is achieved by the first low-pass filter circuit).

As a result, the first low-pass filter circuit can provide stability of operation of the feedback control circuit together with high speed of control response (since the high ESR of the capacitor used in that filter circuit ensures that high frequency components are not substantially excluded from the feedback control signal), while at the same time, effective exclusion of ripple from the output DC voltage of the DC-DC converter can be achieved due to the low ESR of the capacitor of the second low-pass filter circuit.

The capacitor of the first low-pass filter circuit can be for example an aluminum electrolytic capacitor, and the capacitor of the second low-pass filter circuit can be for example an organic high-molecular capacitor or a ceramic capacitor.

DESCRIPTION OF PREFERRED EMBODIMENTS

Figure 1:
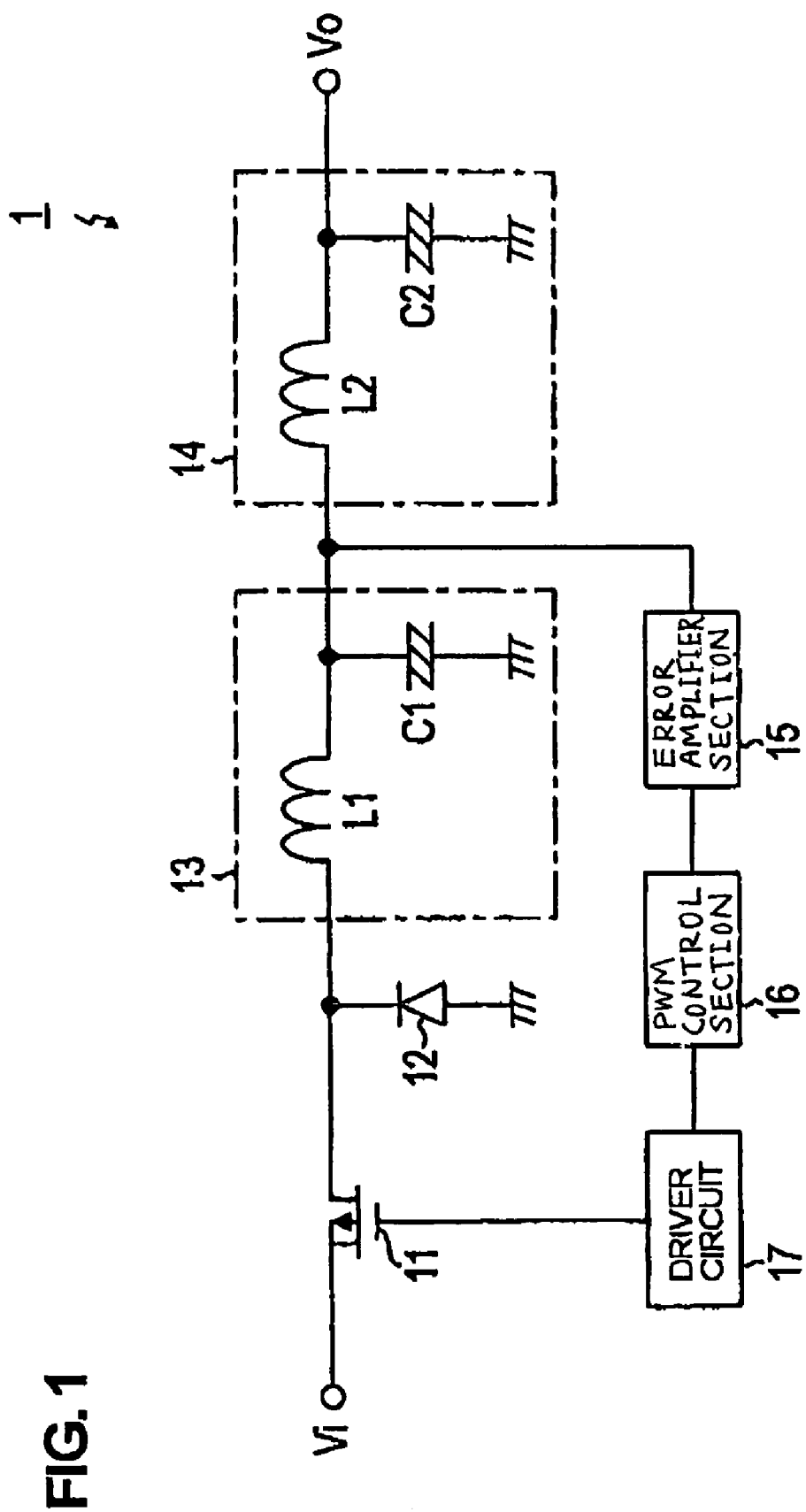
FIG. 1 shows the overall configuration of an embodiment of a DC-DC converter.
Figure 2:
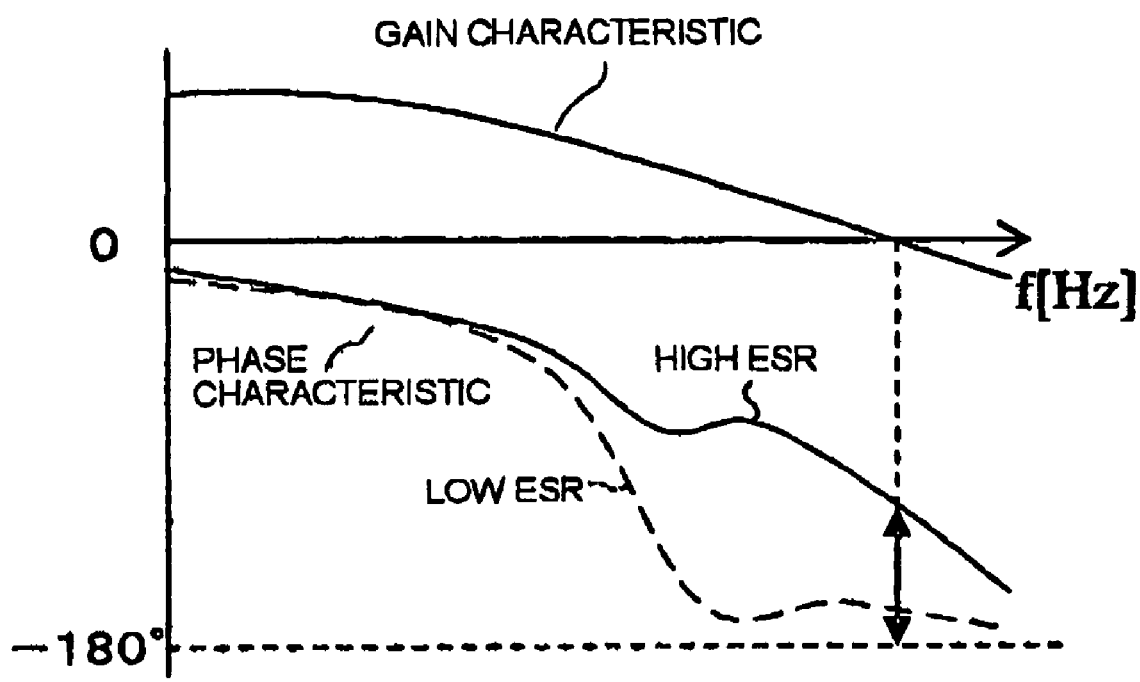
FIG. 2 is a Bode diagram showing DC-DC converter characteristics, for illustrating the effects of ESR of a capacitor in a low-pass filter of the converter.

FIG. 1 shows the overall configuration of an embodiment of a DC-DC converter, denoted by numeral 1. As shown in FIG. 1, the DC-DC converter 1 includes a switching element 11, a return-current diode 12, a No. 1 filter 13, a No. 2 filter 14, an error amplifier section 15, a PWM control section 16 and a driver circuit 17. The switching element 11 of this embodiment is a MOS FET (metal-oxide semiconductor field effect transistor), which converts a DC voltage Vi (i.e., the input supply voltage of the DC-DC converter) to a voltage having a repetitively varying waveform by periodically interrupting a conduction path of the input voltage Vi. The No. 1 filter 13 is a low-pass filter which smoothes the output voltage from the switching element 11, and is formed of an inductor L1 which is connected between the input and output terminals of the filter 13 and a capacitor C1 which is connected between the output terminal of the filter 13 and the circuit ground potential. The return-current diode 12 serves to pass a flywheel current to the No. 1 filter 13 each time the switching element 11 is switched off. The No. 2 filter 14 is connected to receive the output voltage produced from the No. 1 filter 13, and serves to smooth that output voltage to obtain a DC output voltage Vo (which is the output DC voltage of the DC-DC converter 1), and is a low-pass filter formed of an inductor L2 which is connected between the input and output terminals of the filter 14 and a capacitor C2 which is connected between the output terminal of the filter 14 and the circuit ground potential.

The error amplifier section 15 serves to generate an error signal expressing an amount of deviation of the output voltage of the No. 1 filter 13 from a predetermined target value of voltage. The PWM control section 16 generates a PWM (pulse width modulation) signal having a duty ratio that is varied in accordance with the error signal that is generated by the error amplifier section 15. The driver circuit 17 performs switching of the switching element 11, in accordance with the PWM signal that is generated by the PWM control section 16.

Other than for the No. 2 filter 14, the configuration and components shown in FIG. 1 constitute a known chopper-type of voltage step-down switching regulator, i.e., which produces an output DC voltage at a target value that is lower than the input (supply) DC voltage Vi. Hence, the DC-DC converter 1 can be considered as being such a known type of switching regulator with the addition of the No. 2 filter 14 connected to the output terminal of that switching regulator.

The capacitor C1 of the No. 1 filter 13 is an aluminum electrolytic capacitor having a high value of ESR (measured in units of ohms), e.g., having an ESR of several ohms. The capacitor C2 of the No. 2 filter 14 is an organic high-molecular capacitor or a ceramic capacitor having a low value of ESR, e.g., having an ESR of several tens milli-ohms.

The error amplifier section 15, PWM control section 16 and driver circuit 17 are connected in a feedback control loop which performs the above-described control of the switching element 11. In designing the circuit of this embodiment, the capacitor C1 is selected to have a value of ESR whereby the phase margin of this feedback control loop will be greater than 30° (or more preferably, 60°) at the cut-off frequency of the control loop. With this embodiment, the cut-off frequency is 3 kHz. The capacitor C2 is selected to have a sufficiently small value of ESR to ensure that ripple will be effectively excluded from the output DC voltage Vo.

With this configuration of the DC-DC converter 1, a sufficient phase margin can be achieved at the cut-off frequency, without sacrificing the effectiveness of ripple exclusion from the output voltage of the DC-DC converter, and without reducing the loop gain of the control loop at high frequencies. Hence the disadvantages of the phase delay compensation method can be avoided. In addition, these effects are obtained without the need to employ a complex circuit design, as is required with the phase advance compensation method Moreover, due to the use of a capacitor having a low value of ESR as the capacitor C2 of the No. 2 filter 14, effective exclusion of ripple from the output DC voltage Vo can also be achieved. That is to say, although the design of the No. 1 filter 13, using a capacitor C1 having a relatively high value of ESR, sacrifices effectiveness of ripple exclusion in order to obtain a sufficient phase margin and high speed of control response, ripple remaining in the output voltage from the No. 1 filter 13 is removed by the No. 2 filter 14, i.e., a low-pass filter that is unrelated to feedback control and has a capacitor with a low value of ESR.

Thus with this embodiment, although the circuit is configured simply by adding the a No. 2 filter 14 (which is outside the feedback control loop of the DC-DC converter) to a prior art type of DC-DC converter, it becomes possible to achieve an improved combination of a high phase margin and high speed of control response together with effective exclusion of ripple from the output DC voltage of the DC-DC converter. As described above, this is achieved by selecting capacitors having appropriate ESR values to be used in the No. 1 filter 13 and the No. 2 filter 14 respectively.

Other Embodiments

The invention is not limited to the embodiment described above, which is an example of a chopper-type of voltage step-down switching regulator. The invention is equally applicable to any type of DC-DC converter having a control circuit in which feedback control is applied from the output of a low-pass filter that is within the feedback control loop.

What is claimed is:

1. A DC-DC converter comprising
   a switching circuit adapted to convert an input DC voltage to produce a voltage having a repetitively varying waveform,
   a first low-pass filter circuit adapted to smooth said voltage produced by said switching circuit, with said first low-pass filter circuit comprising a capacitor, and
   a control circuit adapted to apply feedback control to said switching circuit based on an output voltage produced from said first low-pass filter circuit, to maintain said output voltage at a predetermined target value,
   wherein:
   said DC-DC converter comprises a second low-pass filter circuit comprising a capacitor, adapted to smooth said output voltage produced from said first low-pass filter circuit for thereby producing a smoothed output DC voltage of said DC-DC converter; and said capacitor of said first low-pass filter circuit is selected to have a value of ESR (equivalent series resistance) sufficiently large that said control circuit operates with a phase margin exceeding a predetermined value, said phase margin being specified with respect to a frequency at which a loop gain of said control circuit becomes zero; and said capacitor of said second low-pass filter circuit is selected to have a value of ESR that is less than said value of ESR of said capacitor of said first low-pass filter circuit, whereby said second low-pass filter circuit achieves a higher degree of ripple exclusion than is achieved by said first low-pass filter circuit.

2. A DC-DC converter according to claim 1, wherein said predetermined value is 30°.

3. A DC-DC converter according to claim 1, wherein said capacitor of said first low-pass filter circuit is an aluminum electrolytic capacitor.

4. A DC-DC converter according to claim 1, wherein said capacitor of said second low-pass filter circuit is selected from a group of types of capacitor including an organic high-molecular capacitor and a ceramic capacitor.

5. A method of designing a DC-DC converter, the DC-DC converter comprising a switching circuit adapted to convert an input DC voltage to produce a voltage having a repetitively varying waveform, a first low-pass filter circuit adapted to smooth said voltage produced by said switching circuit, with said first low-pass filter circuit comprising a capacitor, a control circuit adapted to apply feedback control to said switching circuit based on an output voltage produced from said first low-pass filter circuit, to maintain said output voltage at a predetermined target value, and a second low-pass filter circuit comprising a capacitor, adapted to smooth said output voltage produced from said first low-pass filter circuit for thereby producing a smoothed output DC voltage of said DC-DC converter;

wherein said method comprises steps of:

selecting said capacitor of said first low-pass filter circuit to have a value of ESR (equivalent series resistance) sufficiently large that said control circuit operates with a phase margin exceeding a predetermined value, said phase margin being specified with respect to a frequency at which a loop gain of said control circuit becomes zero; and, selecting said capacitor of said second low-pass filter circuit to have a value of ESR that is less than said ESR of said capacitor of said first low-pass filter circuit.

6. A method of designing a DC-DC converter according to claim 5, wherein said predetermined value is 30°.

* * * * *